United States Patent
Kalamatianos et al.

(10) Patent No.: US 9,058,278 B2
(45) Date of Patent: Jun. 16, 2015

(54) TRACKING PREFETCHER ACCURACY AND COVERAGE

(71) Applicant: Advanced Micro Devices, Inc., Sunnyvale, CA (US)

(72) Inventors: John Kalamatianos, Arlington, MA (US); Paul Keltcher, Lexington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 229 days.

(21) Appl. No.: 13/720,072

(22) Filed: Dec. 19, 2012

(65) Prior Publication Data

US 2014/0173217 A1   Jun. 19, 2014

(51) Int. Cl.
*G06F 12/08* (2006.01)

(52) U.S. Cl.
CPC ...... *G06F 12/0862* (2013.01); *G06F 2212/602* (2013.01); *G06F 2212/6026* (2013.01)

(58) Field of Classification Search
CPC .............. G06F 12/0862; G06F 2212/6026; G06F 2212/6022; G06F 8/4442; G06F 2212/6028; G06F 9/30047; G06F 12/0215
See application file for complete search history.

(56) References Cited

U.S. PATENT DOCUMENTS

| | | | |
|---|---|---|---|
| 2004/0006671 A1* | 1/2004 | Handgen et al. | 711/137 |
| 2011/0113199 A1* | 5/2011 | Tang et al. | 711/137 |
| 2012/0066455 A1* | 3/2012 | Punyamurtula et al. | 711/137 |
| 2012/0084497 A1* | 4/2012 | Subramaniam et al. | 711/123 |
| 2013/0138887 A1* | 5/2013 | Chou | 711/137 |
| 2013/0332705 A1* | 12/2013 | Martinez et al. | 712/220 |
| 2014/0108740 A1* | 4/2014 | Rafacz et al. | 711/137 |

OTHER PUBLICATIONS

Charny et al, Prefetching and memory system behavior of the SPEC95 benchmark suite, published May 1997, IBM journal of research and development vol. 21, No. 3, pp. 265-286.*

Verma et al., A Hybrid Adaptive Feedback Based Prefetcher, Department of Electrical and Computer Engineering Louisiana State University, Baton Rouge, LA 70803.

* cited by examiner

*Primary Examiner* — Aimee Li
*Assistant Examiner* — Jason Blust
(74) *Attorney, Agent, or Firm* — Volpe and Koenig, P.C.

(57) ABSTRACT

A method, an apparatus, and a non-transitory computer readable medium for tracking accuracy and coverage of a prefetcher in a processor are presented. A table is maintained and indexed by an address, wherein each entry in the table corresponds to one address. A number of demand requests that hit in the table on a prefetch, a total number of demand requests, and a number of prefetch requests are counted. The accuracy of the prefetcher is calculated by dividing the number of demand requests that hit in the table on a prefetch by the number of prefetch requests. The coverage of the prefetcher is calculated by dividing the number of demand requests that hit in the table on a prefetch by the total number of demand requests. The table and the counters are reset when a reset condition is reached.

38 Claims, 5 Drawing Sheets

TRACKING PREFETCHER ACCURACY AND COVERAGE

TECHNICAL FIELD

The disclosed embodiments are generally directed to a prefetcher in a processor, and in particular, to tracking the accuracy and coverage of the prefetcher to enable performance tuning of the prefetcher.

BACKGROUND

A prefetcher is used in a processor to improve overall processor performance by speculatively fetching data or instructions before the processor requests the data or instructions. The prefetched data or instructions may be stored in a cache memory or in a buffer.

One way to measure the performance of the prefetcher is based on its accuracy and coverage. The accuracy of the prefetcher indicates whether the prefetched data or instructions are ultimately requested by the processor (a higher accuracy indicates a higher number of prefetches that are ultimately requested). The coverage of the prefetcher relates to the percentage of demand requests that are covered by the prefetcher. Coverage may be estimated by the ratio of demand requests hitting on the prefetched data or instructions to the total number of committed demand requests training the prefetcher.

The performance of the processor may be improved (in terms of overall utilization, number of instructions processed per cycle, or other metric) by tuning the prefetcher to improve its accuracy and/or coverage. If the accuracy and/or coverage of the prefetcher are not high enough, this can lead to cache pollution (having cache entries that will not be used) which in turn could adversely affect the processor's performance.

One existing solution for adjusting prefetcher performance tracks prefetched lines in the cache. One problem with this solution is that the size of the tracking mechanism is directly related to the size of the cache. For example, with a tracking mechanism that uses one bit per cache line and a 2 MB level 2 (L2) cache having 32K lines, 32K bits (or 4 KB) are needed to track all the cache lines. By tying the size of the tracking mechanism to the cache, the capacity of the tracking mechanism is fixed, such that the level of accuracy in the tracking metrics is constrained.

SUMMARY OF EMBODIMENTS

Some embodiments provide a method for tracking accuracy and coverage of a prefetcher in a processor. A table is maintained and indexed by an address, wherein each entry in the table corresponds to one address. A number of demand requests that hit in the table on a prefetch, a total number of demand requests, and a number of prefetch requests are counted. The accuracy of the prefetcher is calculated by dividing the number of demand requests that hit in the table on a prefetch by the number of prefetch requests. The coverage of the prefetcher is calculated by dividing the number of demand requests that hit in the table on a prefetch by the total number of demand requests. The table and the counters are reset when a reset condition is reached.

Some embodiments provide an apparatus for tracking accuracy and coverage of a prefetcher in a processor. A table is indexed by an address, wherein each entry in the table corresponds to one address. A first counter is configured to count a number of demand requests that hit in the table on a prefetch. A second counter is configured to count a total number of demand requests. A third counter is configured to count a number of prefetch requests. An optimization logic block is configured to calculate the accuracy of the prefetcher by dividing a value of the first counter by a value of the third counter, and to calculate the coverage of the prefetcher by dividing the value of the first counter by a value of the second counter. A reset logic block is configured to reset the table, the first counter, the second counter, and the third counter when a reset condition is reached.

Some embodiments provide a non-transitory computer-readable storage medium storing a set of instructions for execution by a general purpose computer to track accuracy and coverage of a prefetcher in a processor. A maintaining code segment maintains a table indexed by an address, wherein each entry in the table corresponds to one address. A first counting code segment counts a number of demand requests that hit in the table on a prefetch. A second counting code segment counts a total number of demand requests. A third counting code segment counts a number of prefetch requests. A first calculating code segment calculates the accuracy of the prefetcher by dividing the number of demand requests that hit in the table on a prefetch by the number of prefetch requests. A second calculating code segment calculates the coverage of the prefetcher by dividing the number of demand requests that hit in the table on a prefetch by the total number of demand requests. A resetting code segment resets the table and the counters when a reset condition is reached.

BRIEF DESCRIPTION OF THE DRAWINGS

A more detailed understanding may be had from the following description, given by way of example in conjunction with the accompanying drawings, wherein.

DETAILED DESCRIPTION

A method, an apparatus, and a non-transitory computer readable medium for tracking accuracy and coverage of a prefetcher in a processor are presented. A table is maintained and indexed by an address; each entry in the table corresponds to one address. A number of demand requests that hit in the table on a prefetch, a total number of demand requests, and a number of prefetch requests are counted. The accuracy of the prefetcher is calculated by dividing the number of demand requests that hit in the table on a prefetch by the number of prefetch requests. The coverage of the prefetcher is calculated by dividing the number of demand requests that hit in the table on a prefetch by the total number of demand requests. The table and the counters are reset when a reset condition is reached.

Figure 1:
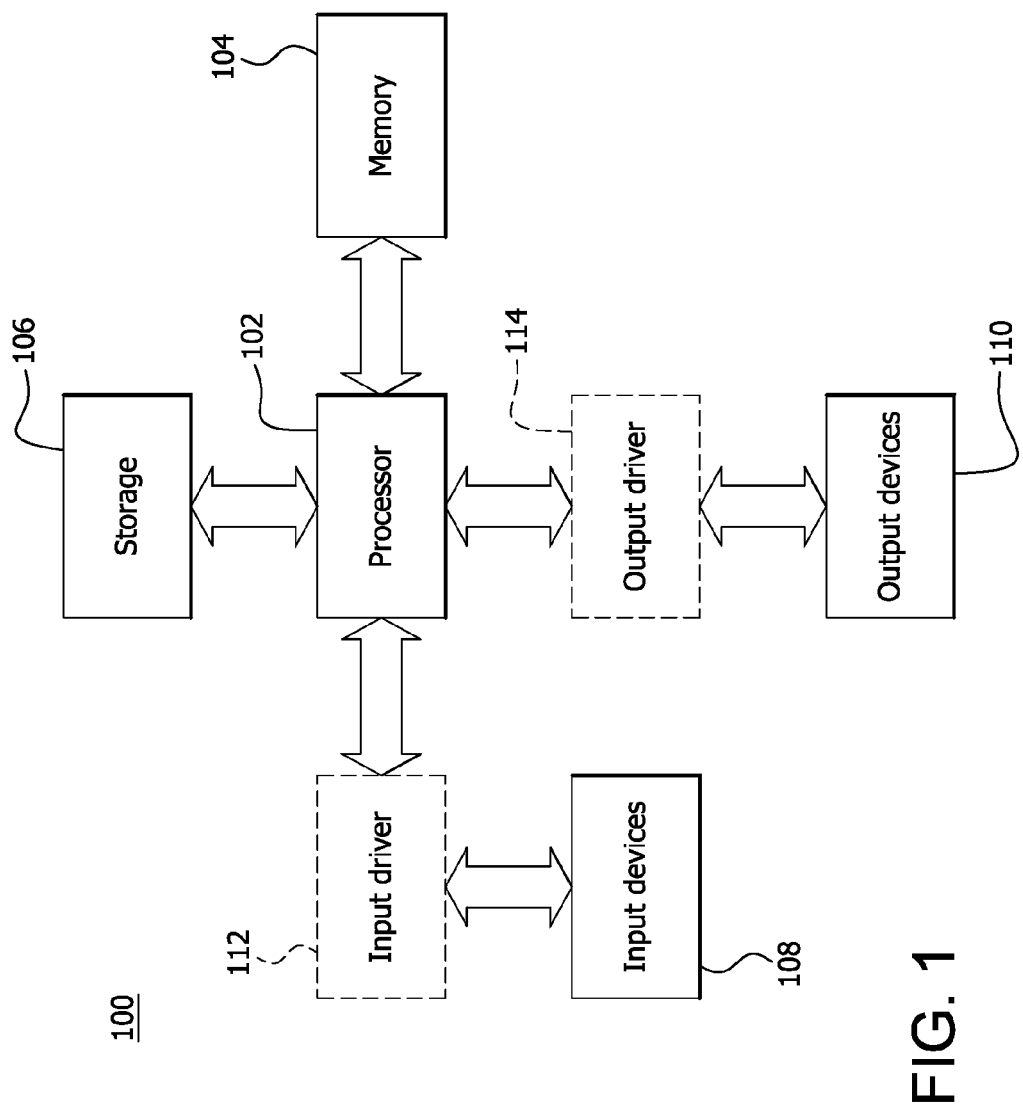
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The following description relates to a prefetcher which may be used to prefetch data or instructions. The operation of the prefetcher is the same, regardless of whether data or instructions are being prefetched. Any examples used to describe the operation are not limited to the data prefetching or instruction prefetching described.

First Embodiment

In a first embodiment, the accuracy and coverage of the prefetcher may be tracked using a table with one bit per entry and several counters. The table and the associated methods are not dependent upon the prefetch algorithm used by the prefetcher. The table may be located close to the prefetcher in the memory hierarchy. For example, a table used to track a prefetcher associated with a level 1 (L1) cache will be located near that prefetcher. The table is not coupled to the cache, permitting the size of the table to be varied based on a desired level of accuracy.

Generally speaking, an optimal size of the table is equal to the number of unique cache line-normalized addresses accessed by an application. This depends on the application's working set (data, if the table covers data prefetching, or instructions, if the table covers instruction prefetching). Usually, the number of unique addresses is large enough that makes the optimal table size prohibitively large. In implementation, a smaller, suboptimal table size is used to provide a good approximation for coverage and accuracy. The size of the table does not alter the operation of the embodiments described.

The table contains one bit per entry and may be implemented in several different ways. In one embodiment, the table may be implemented as a vector. A person skilled in the art can implement the table in a variety of ways without affecting the operation of the embodiments described herein. The table is accessed via a mapping function, described below, in which an index in the table represents an address accessed by the prefetcher.

Several counters are defined and are referred to as follows:

Counter A is a number of demand requests that hit on prefetched data. For example, in data prefetching, A is the number of load/store address hits on prefetched data.

Counter B is a number of demand requests used for training the table. For example, with a data prefetcher, most load/stores are used to train the table.

Counter C is a number of prefetch requests issued.

Counter Z is a number of entries in the table that are set to "1," where an entry in the table is set to "1" if a prefetch has been issued to the address index in the table.

N is a total number of entries in the table.

Based on these counters, several variables are defined:

T is either Counter Z divided by N or is a predefined number of cycles. The definition of T is implementation-specific, and the overall operation is the same, regardless of how T is defined.

T1 is a reset threshold that is compared to T (as described below) and is used to reset the table and the counters when a reset condition is reached.

The accuracy of the prefetcher is the Counter A divided by the Counter C, the number of prefetcher "hits" divided by the total number of prefetch requests issued.

The coverage of the prefetcher is the Counter A divided by the Counter B, and is an indication of how many loads or stores (if used with a data prefetcher) have hit on the prefetched data.

It is noted that setting an entry in the table to "1" for a given indication is a design choice, and the same entry could instead be set to "0" for the same indication with corresponding changes in the evaluation logic.

Figure 2:
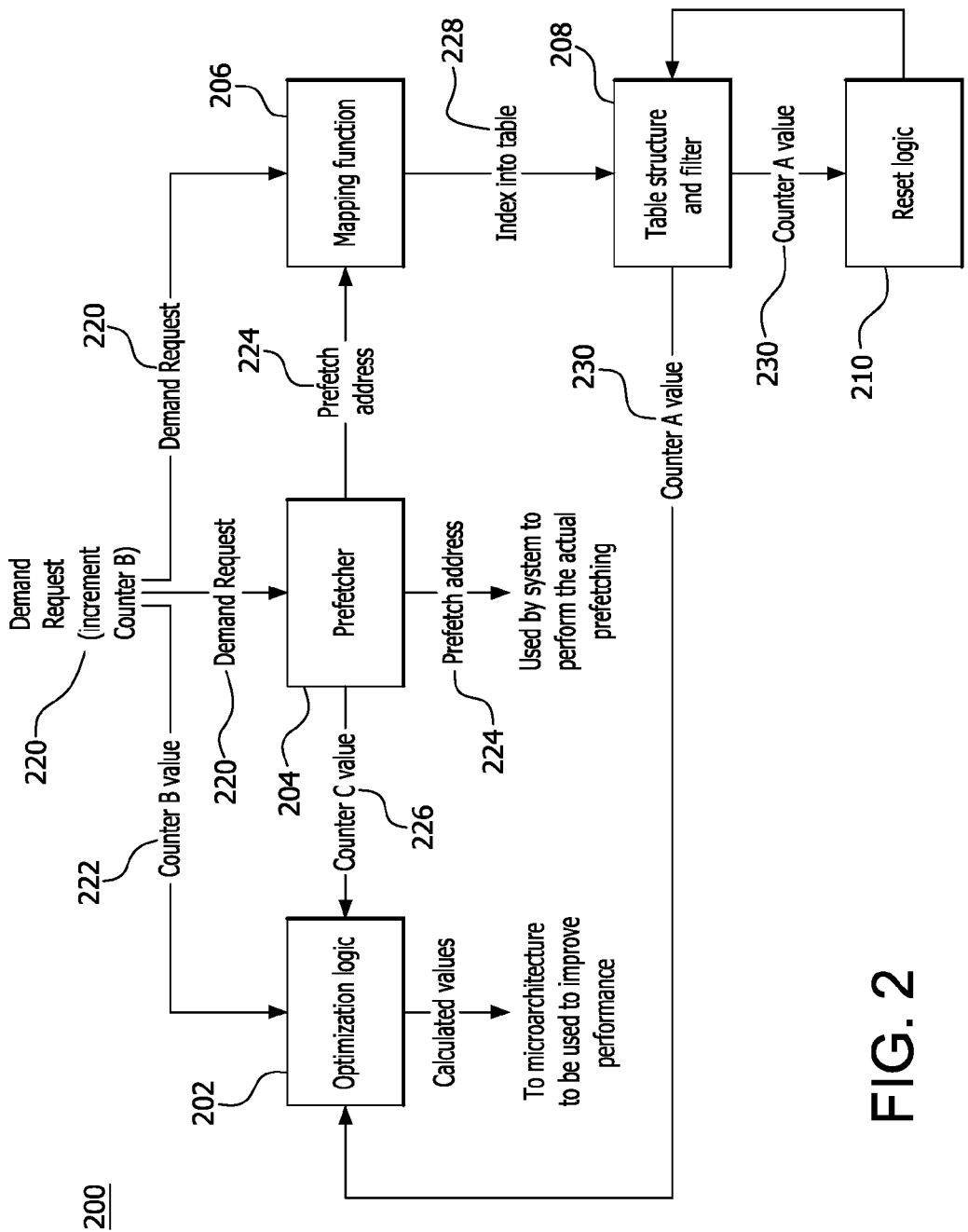
FIG. 2 is a diagram of an apparatus using a table with one bit per entry.

FIG. 2 is a diagram of an apparatus 200 using a table with one bit per entry. The apparatus 200 includes an optimization logic block 202, a prefetcher 204, a mapping function block 206, a table structure and filter 208, and a reset logic block 210. A demand request 220 is received, and Counter B is incremented. The demand request 220 may include any one of: an address of a load/store instruction, a program counter of an instruction, or a starting instruction address of a cache line of the instruction cache. The demand request 220 is forwarded to the prefetcher 204 and to the mapping function block 206. The Counter B may reside in the optimization logic block 202, or the optimization logic block 202 can access the Counter B to obtain the Counter B value 222. The location of the Counter B does not effect the operation of the apparatus 200.

The prefetcher 204 parses the demand request 220 to generate a prefetch address 224, which is used by the system to perform the actual prefetching. The prefetch address 224 is also forwarded to the mapping function block 206. The prefetcher 204 also increments the Counter C. The Counter C may reside in the optimization logic block 202, or the optimization logic block 202 can access the Counter C to obtain the Counter C value 226. The location of the Counter C does not effect the operation of the apparatus 200.

The mapping function block 206 uses the demand request 220 or the prefetch address 224 to generate an index 228 into the table 208. In one implementation, the mapping function block 206 uses a hash function to generate the index 228. For example, the hash function may be an exclusive OR function.

The table structure and filter 208 uses the index 228 to locate the address corresponding to the index 228. If the index 228 is generated based on the demand request 220 and if the entry is a 0, then no prefetch request has been issued for the address. If the entry is a 1, then the Counter A is increased. The Counter A may reside in the optimization logic block 202, or the optimization logic block 202 can access the Counter A to obtain the Counter A value 230. The location of the Counter A does not effect the operation of the apparatus 200. The reset logic block 210 can access the Counter A regardless of its location.

If the index 228 is generated based on the prefetch address 224 and if the entry is a 0, then the entry corresponding to the index is set to 1 (meaning that the current access is a hit in the table) and the Counter Z is increased. If the entry is a 1, this indicates that a prefetch request is likely to have already been issued for the same address.

The optimization logic block 202 uses the values of the Counter A, the Counter B, and the Counter C to calculate the accuracy and coverage of the prefetcher, as described above. The accuracy and coverage of the prefetcher may be determined at any time by examining the counters and performing the appropriate calculations. The accuracy and coverage values may be periodically calculated (with the periodicity being a programmable threshold) or may be calculated prior to resetting the table 208. The calculated accuracy and coverage values are sent to the microarchitecture to be used to tune the prefetcher and improve the prefetcher's performance.

The reset logic block 210 periodically resets the table 208 to ensure that meaningful results are obtained. The reason for this is that over time, all of the entries in the table 208 will be set to "1." Resetting the table 208 helps ensure that the structure works properly. How frequently the reset condition is evaluated depends upon how T is defined. If T is defined as a predetermined number of cycles, then T is compared to T1 every cycle. If T is defined as Counter Z divided by N, then T is compared to T1 every time the Counter Z is incremented.

Regardless of how T is defined, if T exceeds the threshold condition T1, the table 208 is reset (setting all entries to 0) and all of the counters (A, B, C, and Z) are reset to 0. If T does not exceed T1, then the reset logic block 210 does nothing and operation continues as described above.

Figure 3:
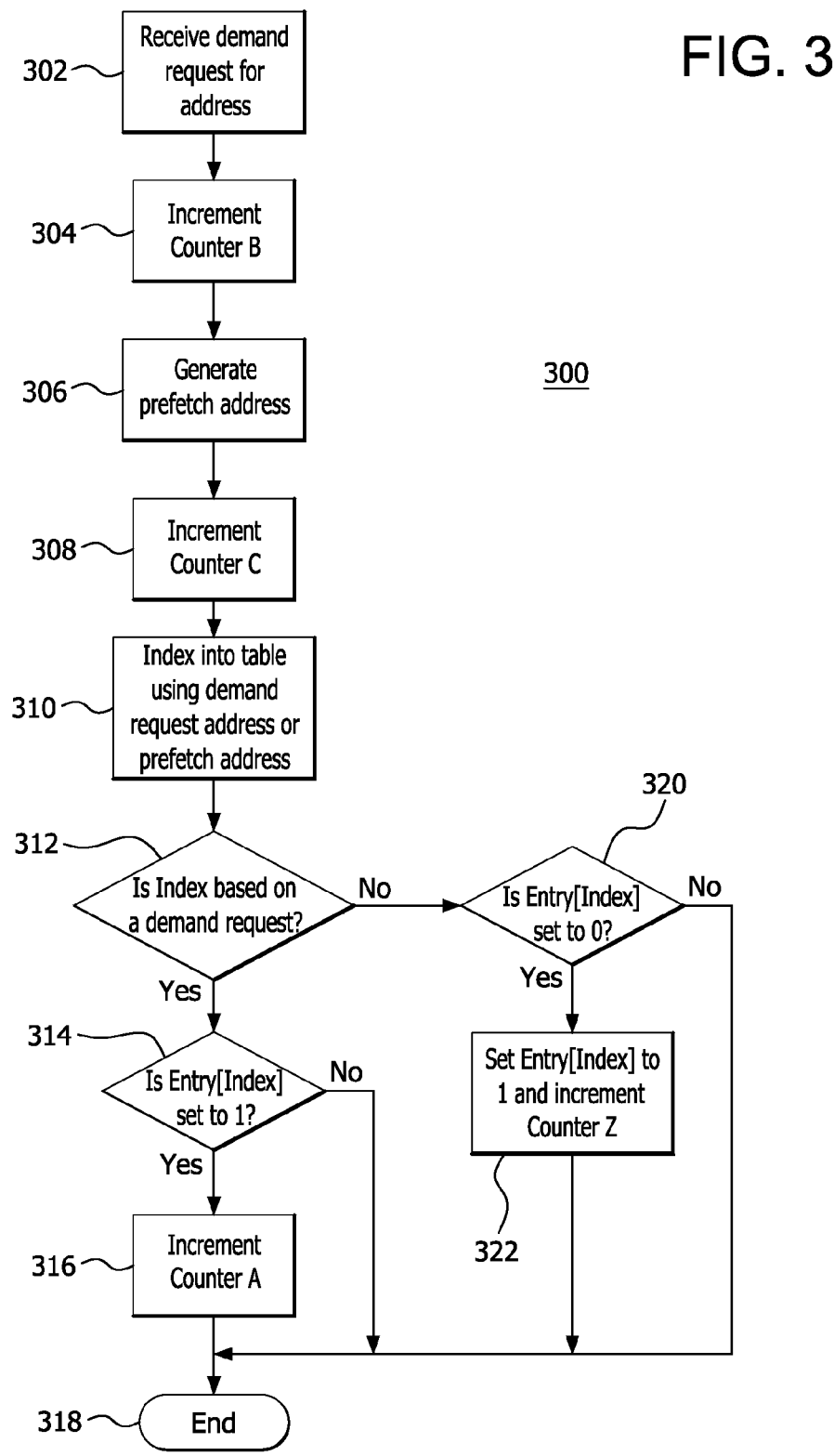
FIG. 3 is a flowchart of a method for updating counters in a first embodiment.

FIG. 3 is a flowchart of a method 300 for updating the counters. A demand request for an address is received (step 302) and the Counter B is incremented (step 304). The prefetcher generates a prefetch address (step 306) and the Counter C is incremented (step 308). An index into the table is generated by the mapping function block based on either the demand request address or the prefetch address (step 310).

A determination is made whether the index is based on the demand request address (step 312). If the index is based on the demand request address, then a check is made whether the entry in the table corresponding to the index is set to 1 (step 314). If the entry corresponding to the index is set to 1, then the Counter A is incremented (step 316) and the method terminates (step 318). If the entry corresponding to the index is not set to 1 (step 314), then the method terminates (step 318).

If the index is not based on the demand request address (step 312), this indicates that the index is based on the prefetch address. Next, a check is made whether the entry in the table corresponding to the index is set to 0 (step 320). If the entry corresponding to the index is set to 0, then the entry is set to 1 (meaning that the current access is a hit in the table) and the Counter Z is incremented (step 322) and the method terminates (step 318). If the entry corresponding to the index is not set to 0 (step 320), then the method terminates (step 318).

Second Embodiment

A second embodiment adds hardware, such that the table includes two bits per entry. In the first embodiment, it is not possible to determine whether the demand request or the prefetch came first. In the first embodiment, only the prefetch sets the corresponding table entry to "1." But it is unknown whether the demand request had already accessed that address. A benefit of knowing this information is to provide multiple ways to reset the table.

The second embodiment also addresses an aliasing issue with the table. Depending on the hash function used by the mapping function block, it is possible that multiple addresses will map to the same table entry. By using a small table size, there cannot be a one-to-one correspondence between the address space and the table entries. If multiple addresses map to the same table entry, it is not possible to determine which address (either the demand request address or the prefetch address) caused the table entry to be set.

In the second embodiment, the table includes two bits per entry. A first bit, Bit0, is set if a prefetch request at an address has been issued. A second bit, Bit1, is set if a demand request at the same address has been issued.

Counters A, B, and C and the value of N are the same as described in connection with the first embodiment. The second embodiment also uses the following counters:

Counter Z is a number of Bit0 bits set to 1.
Counter Y is a number of Bit1 bits set to 1.
Counter X1 is a number of times that a prefetch request at an address hits on Bit0 set to 1, meaning that the address has already been accessed by another prefetch request (aliasing).
Counter X2 is a number of times that a demand request at an address hits on Bit1 set to 1, meaning that the address has already been accessed by another demand request (aliasing).

Based on the counters, the accuracy and coverage are determined in the same manner as in the first embodiment. The second embodiment defines the following additional variables:

Tz is a threshold for resetting the table based on the Counter Z.
Ty is a threshold for resetting the table based on the Counter Y.
Tx is a threshold for resetting the table based on aliasing in the table.

The second embodiment uses the apparatus 200 in a similar manner; the differences in the operation of the apparatus in this embodiment are described in connection with FIGS. 4 and 5.

Figure 4:
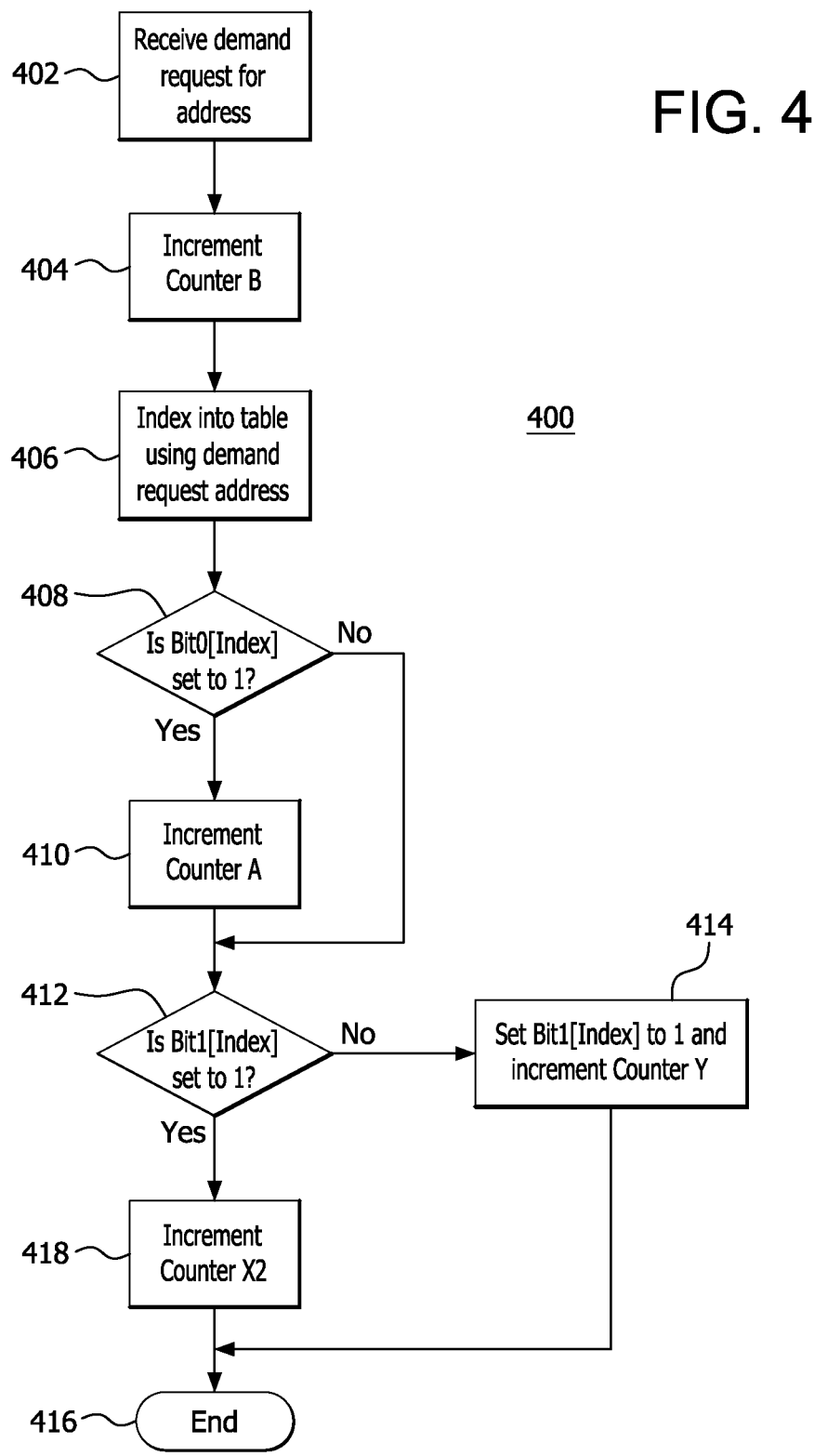
FIG. 4 is a flowchart of a method for updating counters in a second embodiment when a demand request for an address is received.

FIG. 4 is a flowchart of a method 400 for updating counters when a demand request for an address is received (step 402). The Counter B is incremented (step 404) and the demand request is passed to the mapping function block, which generates an index into the table using the demand request address (step 406). Bit0 of the entry corresponding to the index is checked to determine if it is set to 1 (step 408). If the Bit0 of the entry is set to 1, then Counter A is incremented (step 410).

If the Bit0 of the entry is not set to 1 (step 408) or after the Counter A is incremented (step 410), Bit1 of the entry corresponding to the index is checked to determine if it is set to 1 (step 412). If the Bit1 of the entry is not set to 1, then Bit1 of the entry is set to 1 and the Counter Y is incremented (step 414), indicating that the address is being accessed by the current demand request, and the method terminates (step 416). If the Bit1 of the entry is set to 1 (indicating that the address has previously been accessed by another demand request), then Counter X2 is incremented (step 418) and the method terminates (step 416).

Figure 5:
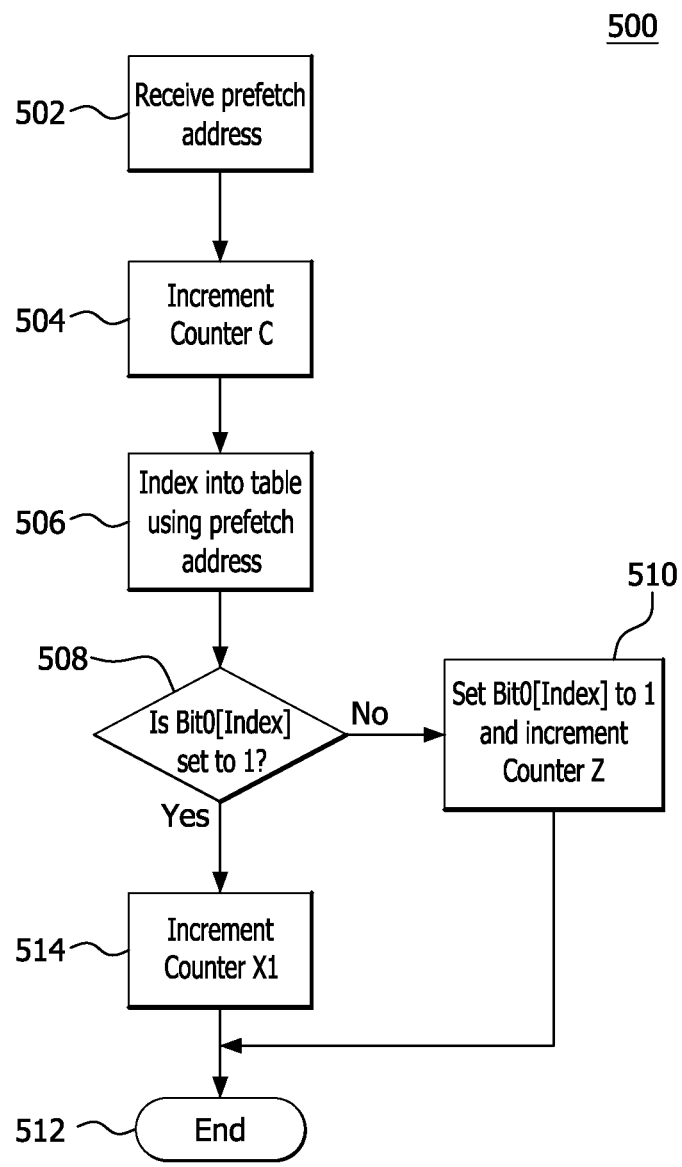
FIG. 5 is a flowchart of a method for updating counters in the second embodiment when a prefetch address is received.

FIG. 5 is a flowchart of a method 500 for updating counters when a prefetch address is received (step 502). The Counter C is incremented (step 504) and the prefetch address is passed to the mapping function block, which generates an index into the table using the prefetch address (step 506). Bit0 of the entry corresponding to the index is checked to determine if it is set to 1 (step 508). If the Bit0 of the entry is not set to 1, then Bit0 of the entry is set to 1 and the Counter Z is incremented (step 510) and the method terminates (step 512). If the Bit0 of the entry is set to 1 (indicating that the address has previously been accessed by another prefetch), then the Counter X1 is incremented (step 514) and the method terminates (step 512).

The reset logic block will reset the table and all of the counters (A, B, C, X1, X2, Y, and Z) if any of the counters exceed their corresponding thresholds. If either Counter X1 or Counter X2 exceeds Tx, then the reset operation is performed. If Counter Y exceeds Ty, then the reset operation is performed. If Counter Z exceeds Tz, then the reset operation is performed. The multiple reset thresholds may be evaluated in parallel, and the reset operation may be performed in a single cycle. The reset thresholds are evaluated each time the corresponding counter is incremented.

The second embodiment may approximate accuracy and coverage more accurately than the first embodiment, because the second embodiment resets the table in the event of frequent aliasing (either among prefetches or demand requests). Eliminating the aliasing in the table is a benefit, because fewer entries may be needed in the table to achieve the same results.

Regardless of the embodiment used, the metrics generated by the optimization logic block may be used to tune the prefetcher in various ways. The prefetcher may be tuned at runtime, based on the accuracy and coverage metrics. For example, the prefetcher may be throttled (either by varying the stride length of the prefetcher or by lowering the maximum rate of prefetch requests issued by the prefetcher) if the metrics indicate that the prefetcher is not sufficiently accurate over a predetermined period of time. The predetermined period of time varies, depending on the application that is running on the processor.

The coverage of the prefetcher may be used to increase its aggressiveness. For example, an indication of low coverage means that the prefetcher is prefetching a small number of addresses (a small number of loads/stores if performing data prefetching). A more aggressive prefetcher leads to higher coverage, which in turn leads to a higher number of instructions per cycle. Providing higher coverage with the same level of accuracy results in higher overall prefetcher performance, assuming that the prefetcher can maintain a high level of accuracy with the increased coverage.

The metrics generated by the optimization logic block may alternatively be presented to a user of the computer system, such that the user may decide whether to implement prefetching based on the metrics. The metrics may alternatively be used as performance counters, for example, to profile an application or to profile the prefetcher.

Advantages of the embodiments described herein include, but are not limited to: using less hardware than existing methods, the ability to perform a fast table update (no need to wait for the prefetch or the demand request to complete), and can be built outside of all timing-critical paths.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for tracking accuracy and coverage of a prefetcher in a processor, comprising:
   maintaining a table indexed by an address, wherein:
      each entry in the table corresponds to one address;
      the table includes one bit per entry; and
      the entry is set to "1" when a prefetch has been issued to the corresponding address;
   counting a number of demand requests that hit in the table on a prefetch using a first counter;
   calculating the accuracy of the prefetcher by dividing the number of demand requests that hit in the table on a prefetch by a number of prefetch requests, the number of prefetch requests being stored in a second counter;
   calculating the coverage of the prefetcher by dividing the number of demand requests that hit in the table on a prefetch by a total number of demand requests, the total number of demand requests being stored in a third counter; and
   resetting the table and the counters when a reset condition is reached, wherein:
      the reset condition is reached when a number of entries in the table that are set to "1" divided by a total number of entries in the table exceeds a predetermined value; and
      the reset condition is checked each time an entry in the table is set to "1".

2. The method according to claim 1, wherein indexing into the table is performed by a mapping function block.

3. The method according to claim 2, wherein the mapping function block includes a hash function.

4. The method according to claim 2, wherein the mapping function block uses a demand request to generate the index.

5. The method according to claim 2, wherein the mapping function block uses a prefetch address to generate the index.

6. The method according to claim 1, wherein:
the reset condition is reached after a predetermined number of cycles; and
the reset condition is checked every cycle.

7. A method for tracking accuracy and coverage of a prefetcher in a processor, comprising:
maintaining a table indexed by an address, wherein:
each entry in the table corresponds to one address;
the table includes two bits per entry;
a first bit in the entry is set to "1" when a prefetch is made to the corresponding address; and
a second bit in the entry is set to "1" when a demand request is made to the corresponding address;
counting a number of demand requests that hit in the table on a prefetch using a first counter;
calculating the accuracy of the prefetcher by dividing the number of demand requests that hit in the table on a prefetch by a number of prefetch requests, the number of prefetch requests being stored in a second counter;
calculating the coverage of the prefetcher by dividing the number of demand requests that hit in the table on a prefetch by a total number of demand requests, the total number of demand requests being stored in a third counter; and
resetting the table and the counters when a reset condition is reached, wherein:
the reset condition is reached when a number of first bits in the entries in the table that are set to "1" exceeds a first predetermined value; and
the reset condition is checked each time a first bit in an entry in the table is set to "1".

8. The method according to claim 7, wherein:
the reset condition is reached when a number of second bits in the entries in the table that are set to "1" exceeds a second predetermined value; and
the reset condition is checked each time a second bit in an entry in the table is set to "1".

9. The method according to claim 7, wherein indexing into the table is performed by a mapping function block.

10. The method according to claim 9, wherein the mapping function block includes a hash function.

11. The method according to claim 9, wherein the mapping function block uses a demand request to generate the index.

12. The method according to claim 9, wherein the mapping function block uses a prefetch address to generate the index.

13. The method according to claim 7, wherein:
the reset condition is reached after a predetermined number of cycles; and
the reset condition is checked every cycle.

14. A method for tracking accuracy and coverage of a prefetcher in a processor, comprising:
maintaining a table indexed by an address, wherein:
each entry in the table corresponds to one address;
the table includes two bits per entry;
a first bit in the entry is set to "1" when a prefetch is made to the corresponding address; and
a second bit in the entry is set to "1" when a demand request is made to the corresponding address;
counting a number of demand requests that hit in the table on a prefetch using a first counter;
calculating the accuracy of the prefetcher by dividing the number of demand requests that hit in the table on a prefetch by a number of prefetch requests, the number of prefetch requests being stored in a second counter;
calculating the coverage of the prefetcher by dividing the number of demand requests that hit in the table on a prefetch by a total number of demand requests, the total number of demand requests being stored in a third counter; and
resetting the table and the counters when a reset condition is reached, wherein:
the reset condition is reached when a number of times that a prefetch request at an address hits in the table when the corresponding first bit of the entry in the table is set to "1" exceeds a predetermined value; and
the reset condition is checked each time a prefetch request at an address hits in the table when the corresponding first bit of the entry in the table is set to "1".

15. The method according to claim 14, wherein indexing into the table is performed by a mapping function block.

16. The method according to claim 15, wherein the mapping function block includes a hash function.

17. The method according to claim 15, wherein the mapping function block uses a demand request to generate the index.

18. The method according to claim 15, wherein the mapping function block uses a prefetch address to generate the index.

19. The method according to claim 14, wherein:
the reset condition is reached after a predetermined number of cycles; and
the reset condition is checked every cycle.

20. A method for tracking accuracy and coverage of a prefetcher in a processor, comprising:
maintaining a table indexed by an address, wherein:
each entry in the table corresponds to one address;
the table includes two bits per entry;
a first bit in the entry is set to "1" when a prefetch is made to the corresponding address; and
a second bit in the entry is set to "1" when a demand request is made to the corresponding address;
counting a number of demand requests that hit in the table on a prefetch using a first counter;
calculating the accuracy of the prefetcher by dividing the number of demand requests that hit in the table on a prefetch by a number of prefetch requests, the number of prefetch requests being stored in a second counter;
calculating the coverage of the prefetcher by dividing the number of demand requests that hit in the table on a prefetch by a total number of demand requests, the total number of demand requests being stored in a third counter; and
resetting the table and the counters when a reset condition is reached, wherein:
the reset condition is reached when a number of times that a demand request at an address hits in the table when the corresponding second bit of the entry in the table is set to "1" exceeds a predetermined value; and
the reset condition is checked each time a demand request at an address hits in the table when the corresponding second bit of the entry in the table is set to "1".

21. The method according to claim 20, wherein indexing into the table is performed by a mapping function block.

22. The method according to claim 21, wherein the mapping function block includes a hash function.

23. The method according to claim 21, wherein the mapping function block uses a demand request to generate the index.

24. The method according to claim 21, wherein the mapping function block uses a prefetch address to generate the index.

25. The method according to claim 20, wherein:
the reset condition is reached after a predetermined number of cycles; and
the reset condition is checked every cycle.

26. An apparatus for tracking accuracy and coverage of a prefetcher in a processor, comprising:
a table indexed by an address, wherein:
each entry in the table corresponds to one address;
the table includes one bit per entry; and
the entry is set to "1" when a prefetch has been issued to the corresponding address;
a first counter configured to count a number of demand requests that hit in the table on a prefetch;
a second counter configured to count a total number of demand requests;
a third counter configured to count a number of prefetch requests;
an optimization logic circuitry configured to:
calculate the accuracy of the prefetcher by dividing a value of the first counter by a value of the third counter;
calculate the coverage of the prefetcher by dividing the value of the first counter by a value of the second counter; and
a reset logic circuitry configured to reset the table, the first counter, the second counter, and the third counter when a reset condition is reached, wherein:
the reset condition is reached when a number of entries in the table that are set to "1" divided by a total number of entries in the table exceeds a predetermined value; and
the reset logic circuitry is further configured to check the reset condition each time an entry in the table is set to "1".

27. The apparatus according to claim 26, further comprising:
a mapping function circuitry configured to generate an index into the table.

28. The apparatus according to claim 27, wherein the mapping function circuitry is further configured to use a hash function.

29. The apparatus according to claim 27, wherein the mapping function circuitry is further configured to use a demand request to generate the index.

30. The apparatus according to claim 27, wherein the mapping function circuitry is further configured to use a prefetch address to generate the index.

31. The apparatus according to claim 26, wherein:
the reset condition is reached after a predetermined number of cycles; and
the reset logic circuitry is further configured to check the reset condition every cycle.

32. An apparatus for tracking accuracy and coverage of a prefetcher in a processor, comprising:
a table indexed by an address, wherein:
each entry in the table corresponds to one address;
the table includes two bits per entry;
a first bit in the entry is set to "1" when a prefetch is made to the corresponding address; and
a second bit in the entry is set to "1" when a demand request is made to the corresponding address;
a first counter configured to count a number of demand requests that hit in the table on a prefetch;
a second counter configured to count a total number of demand requests;
a third counter configured to count a number of prefetch requests;
an optimization logic circuitry configured to:
calculate the accuracy of the prefetcher by dividing a value of the first counter by a value of the third counter;
calculate the coverage of the prefetcher by dividing the value of the first counter by a value of the second counter; and
a reset logic circuitry configured to reset the table, the first counter, the second counter, and the third counter when a reset condition is reached, wherein:
the reset condition is reached when a number of first bits in the entries in the table that are set to "1" exceeds a first predetermined value.

33. The apparatus according to claim 32, wherein:
the reset condition is reached when a number of second bits in the entries in the table that are set to "1" exceeds a second predetermined value.

34. The apparatus according to claim 32, further comprising:
a mapping function circuitry configured to generate an index into the table.

35. The apparatus according to claim 34, wherein the mapping function circuitry is further configured to use a hash function.

36. The apparatus according to claim 34, wherein the mapping function circuitry is further configured to use a demand request to generate the index.

37. The apparatus according to claim 34, wherein the mapping function circuitry is further configured to use a prefetch address to generate the index.

38. The apparatus according to claim 32, wherein:
the reset condition is reached after a predetermined number of cycles; and
the reset logic circuitry is further configured to check the reset condition every cycle.

* * * * *